United States Patent [19]

Kmonk et al.

[11] 4,376,092
[45] Mar. 8, 1983

[54] NUCLEAR FUEL ASSEMBLY WEAR SLEEVE

[75] Inventors: Stanley Kmonk; Dennis J. Cadwell, both of Plum Borough, Pa.

[73] Assignee: Westinghouse Electric Corp., Pittsburgh, Pa.

[21] Appl. No.: 102,046

[22] Filed: Dec. 10, 1979

[51] Int. Cl.³ .............................................. G21C 1/04
[52] U.S. Cl. .................................. 376/353; 376/224; 376/449
[58] Field of Search ....................... 176/76, 78, 79, 35, 176/36 R; 376/353, 224, 449

[56] References Cited

U.S. PATENT DOCUMENTS

| | | | |
|---|---|---|---|
| 3,425,905 | 2/1969 | Greenhalgh | 176/78 |
| 3,475,273 | 10/1969 | Krawiec | 176/78 |
| 3,481,832 | 12/1969 | Rickert | 176/78 |
| 3,770,583 | 11/1973 | Klumb | 176/78 |
| 3,814,667 | 6/1974 | Klumb | 176/78 |
| 3,976,834 | 8/1976 | Bevilacqua | 176/78 |
| 4,284,475 | 8/1981 | Anthony | 376/352 |

*Primary Examiner*—Donald P. Walsh
*Attorney, Agent, or Firm*—Z. L. Dermer

[57] ABSTRACT

An improved control rod guide tube for use in a fuel assembly in a nuclear reactor. The guide tube extends the complete length of the fuel assembly and has its upper end fastened in a cylindrical housing by swaging the guide tube material into grooves formed in the housing walls. To eliminate wear on the guide tube inner walls caused by hydraulic induced vibratory forces on a control rod adapted to move therein, a thin-walled chrome plated sleeve is threaded into the top end of the guide thimble and extends downwardly a distance sufficient to be engaged by the control rod during reactor operation. The sleeve serves as a highly resistant wear surface between the control rod and walls on the guide tube in the fuel assembly.

8 Claims, 2 Drawing Figures

NUCLEAR FUEL ASSEMBLY WEAR SLEEVE

BACKGROUND OF THE INVENTION

The invention described herein relates to nuclear reactor fuel assemblies and more particularly to an improvement in the design of control rod guide thimbles or tubes for minimizing control rod wear on the guide tubes during reactor operation.

Commercial nuclear reactor fuel assemblies include an array of fuel rods and control rod guide tubes held in spaced relationship with each other by grids of eggcrate configuration located at intervals along their length. Top and bottom nozzles are connected to the control rod guide tubes and these components together with grids form the structural framework for the assembly. The guide tubes principally provide a pathway for control rod insertion and withdrawal as the control rods are moved vertically to control reactor fissioning.

Each control rod guide tube is open at both ends to permit coolant to flow upwardly therethrough during reactor operation. Since the coolant flows at high velocity and pressure, it has the characteristic of inducing vibrations in the control rods, thus causing them to rapidly and cyclically engage the inner surface of their guide tubes. This action induces wear in the guide tubes, particularly in those areas where the tip of the control rod interfaces with the guide tube inner surfaces. The wear occurs circumferentially on the guide tube and it is evident that since the control rods are not moved a substantial distance over a relatively long time period, the wear could cause weakness of sufficient magnitude in each guide tube to substantially decrease its useful life.

SUMMARY OF THE INVENTION

Briefly stated, to overcome the above disadvantages of the prior art, a thin walled wear sleeve is fitted into the top end of each control rod guide tube and secured at its upper end to the top nozzle. The sleeve preferably is made of stainless steel and is provided with a hard chrome or other wear resistant surface at the point where major wear occurs along the guide tube length. Although the sleeve is disclosed as being threaded into the nozzle, it may be crimped into internal grooves or otherwise secured in the nozzle extension.

BRIEF DESCRIPTION OF THE DRAWINGS

While the specification concludes with claims particularly pointing out and distinctly claiming the suject matter of the invention, it is believed the invention will be better understood from the following description taken in connection with the accompanying drawing wherein:

DESCRIPTION OF THE PREFERRED EMBODIMENT

Figure 2:
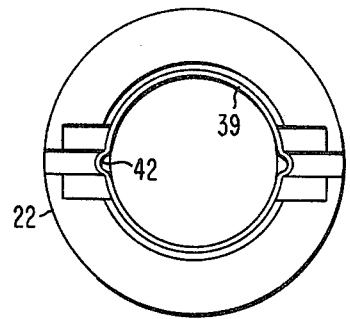
FIG. 2 is a plan view of the guide tube of FIG. 1.
Figure 1:
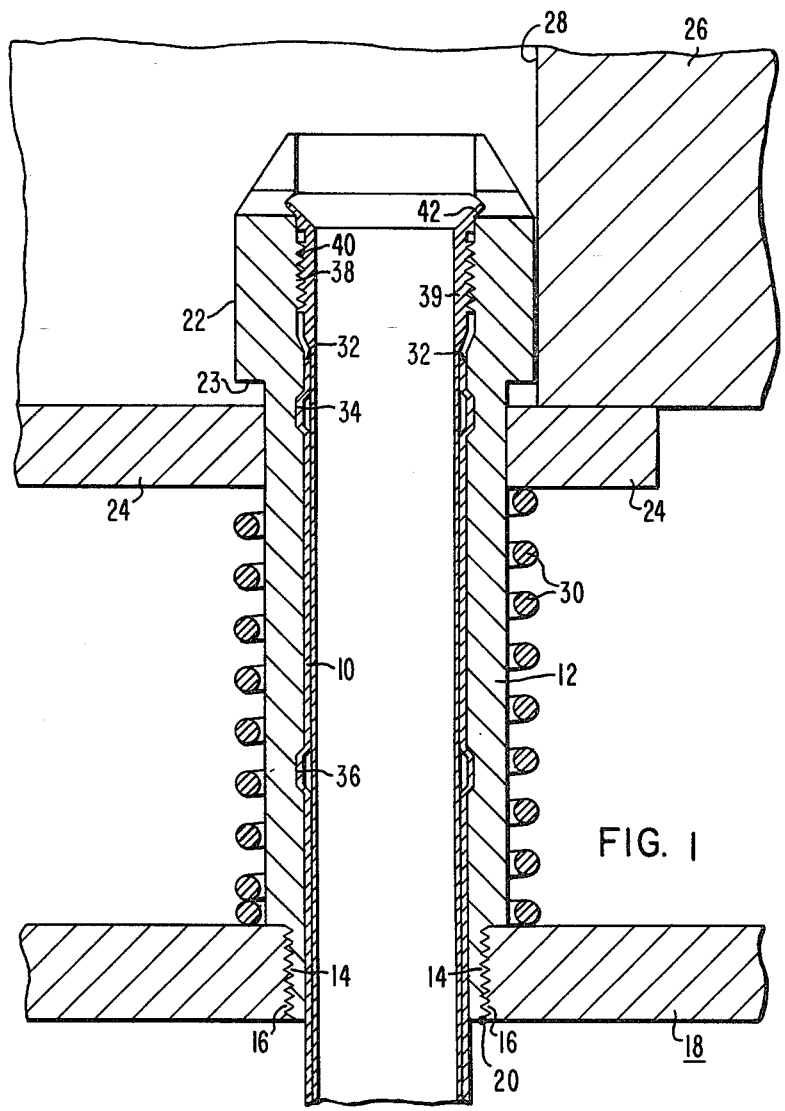
FIG. 1 is a sectional view in elevation illustrating the disposition of a wear sleeve in a housing enclosing the top end of a control rod guide tube.

Referring to the drawing wherein like reference characters designate like or corresponding parts throughout the several views, there is shown a single control rod guide tube 10 in relation to other conventional support structure at the top of a nuclear reactor fuel assembly. Although a number of control rod guide tubes are used in each assembly, only one is shown herein to illustrate the invention. The housing 12 which encloses each guide tube 10 is equipped with outer screw threads 14 at its base which screw into complementary threads 16 machined in an adapter plate 18 immovably fixed in the top nozzle of the fuel assembly. To prevent the housing from rotating out of the adapter plate, a number of tack welds 20 are made at spaced intervals at the housing-adapter plate interface.

The upper end of housing 12 includes a section 22 of increased diameter having a lip or projection 23 adapted to engage the upper surface of a spider 24. The upper core plate 26 contains an opening 28 into which the upper end of housings 22 project. When the core plate is initially located in position in the reactor, it engages the upper surface of spider 24 as shown and causes it to move downwardly and thus compress spring 30 an initial amount to impart a downward force or load on the fuel assembly. This initially imposed force helps prevent upward movement of the fuel assembly resulting from upwardly directed hydraulic forces imposed on the fuel assembly during reactor operation. On startup, as the reactor heats to its operating temperature, the fuel assembly and guide thimbles expand and increase in length. The purpose of opening 28 in the core plate is to accommodate guide thimble growth and since they are not restricted against axial movement, the tubes move upwardly into opening 28 as they grow in length, and as plate 18 initially compresses spring 30 against the underside of stationary spider 24 and the core plate 26.

Each control rod guide tube in housing 12 terminates at 32 within a few inches of the upper end of the housing. The tube is immovably fixed in housing 12 by a pair of machined grooves 34, 36 and walls of the guide tube which are swaged outwardly into the grooves as shown to fully and immovably lock the parts against relative axial movement. The upper end of housing 12 is of a greater inner diameter than the remainder of housing length and is provided with screw threads 38.

To eliminate wear on the upper end of each control rod guide tube in the areas where the end of each control rod is located, a wear sleeve 39 is fixed in the upper end of the guide tube by a threaded connection 40. The outer surface of the sleeve contains external threads for about 1 inch–1.5 inch from its upper end which engage the complementary threads 38 formed on the enlarged part of housing 12. The upper end of the sleeve is peened over at 42 to positively lock the sleeve in the guide tube. This feature permits the sleeve to be removed and replaced with a new sleeve in the event of damage or unusual wear. To accommodate wear, the wear sleeve is plated with a chrome layer between 0.0002 and 0.0007 inch thick over the entire thread area and the inner surface of the sleeve. The sleeve extends downwardly through housing 12 and into the control rod guide thimble for about 24 inches since the major part of wear will take place in this area.

It is apparent that many modifications and variations are possible in light of the above teachings. For example, the upper end of the wear sleeve could be mechanically attached to the top nozzle by bulged sections such as shown at 36 instead of the screw threads illustrated. It therefore is to be understood that within the scope of the appended claims, the invention may be practiced other than as specifically described.

We claim:

1. An improved control rod guide tube for a nuclear reactor fuel assembly comprising a tube adapted to extend the length of said fuel assembly;
   a housing enclosing the upper part of said tube, said housing extending through a supporting spider at its upper end and being attached at its lower end to a top nozzle adapter plate, and means securing the tube to said housing;
   a wear sleeve in said tube having an inner diameter only slightly greater than a control rod adapted to be positioned in the upper end of said tube,
   said sleeve being of a length which extends inwardy into the tube a distance beyond the lower surface of said adapter plate in the top nozzle;
   threaded means fastening said wear sleeve to said housing at a location above said top nozzle adapter plate; and
   said wear sleeve comprising a material highly resistant to wear, the wear action on said sleeve being caused by a control rod moving relative thereto during operation of the reactor in which the control rod guide tube is adapted to be used.

2. The guide tube according to claim 1 wherein the means securing the tube to said housing includes at least one groove machined in the housing inner surface, and the material comprising the tube is displaced in said grooves to thereby preclude axial movement of the tube with respect to the housing.

3. The guide tube according to claim 1 wherein said housing includes an upper section having an inner diameter greater than the inner diameter of the remaining length thereof;
   said wear sleeve in the tube having a uniform inner diameter throughout its length, and a greater outer diameter at its upper end opposite said housing section; and
   said means securing the wear sleeve to the housing includes complementary locking members on the mating wear sleeve and housing surfaces which holds the sleeve immovably in the tube.

4. The guide tube according to claim 3 wherein the tube in said housing terminates at its upper end just below the housing section of greater inner diameter to provide a cylindrical space within which is located that part of the wear sleeve of greater outer diameter.

5. The guide thimble according to claim 4 wherein the complementary locking members respectively on the wear sleeve and housing upper section surfaces include machine threads which serve to hold the wear sleeve immovably in said housing.

6. The guide thimble according to claim 1 wherein the highly resistant wear material includes chrome plated on the inner surface of the wear sleeve.

7. The guide thimble according to claim 3 wherein the top end of the wear sleeve is deformed outwardly into engagement with the housing to positively lock the wear sleeve in said housing.

8. The guide thimble according to claim 1 wherein said wear sleeve is secured to said housing only at said location above said top nozzle adapter plate.

* * * * *